Jan. 20, 1942.                P. A. CAMPBELL                 2,270,646
                                  MOWER
                           Filed Aug. 15, 1939            2 Sheets-Sheet 1

INVENTOR.
PHILIP ALEXANDER CAMPBELL
ATTORNEY.

Jan. 20, 1942.      P. A. CAMPBELL      2,270,646
MOWER
Filed Aug. 15, 1939      2 Sheets-Sheet 2
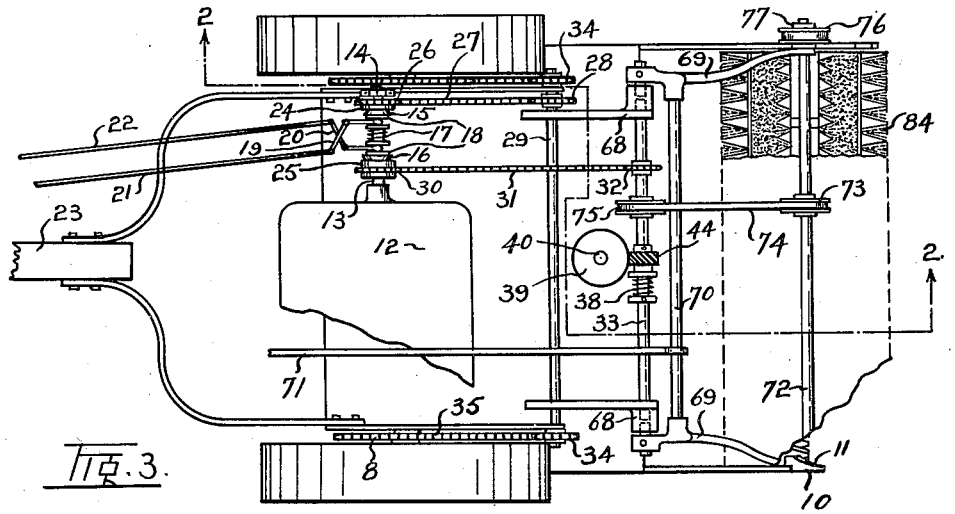
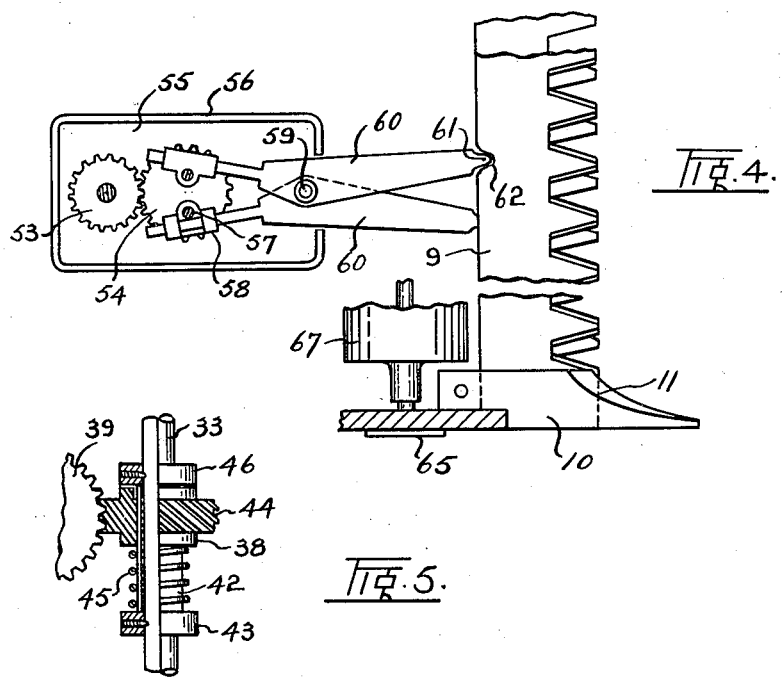
INVENTOR.
PHILIP ALEXANDER CAMPBELL
Ernest E. Carver
ATTORNEY.

Patented Jan. 20, 1942

2,270,646

UNITED STATES PATENT OFFICE 2,270,646

MOWER

Philip Alexander Campbell, Vancouver, British Columbia, Canada

Application August 15, 1939, Serial No. 290,190

2 Claims. (Cl. 56—26.5)

My invention relates to improvements in mowers of the sickle type which are particularly adapted for use in cutting and trimming lawns.

The objects of the invention are to provide means whereby the grass may be cut to the full width of the machine; to provide for the cut to be of even height throughout; to provide means for delivering all the grass cut into a suitable receptacle, and to provide means whereby the machine can be used for brushing the lawn after cutting.

The invention consists of a mower having a pair of reciprocatory sickle knives supported between side frames, a brush above the knives, means for reciprocating the knives and for rotating the brush, the reciprocating means for the knives being so disposed that the trajectory of the grass thrown by the brush is not obstructed adjacent the side frames, as will be more fully described in the following specification and shown in the accompanying drawings, in which:

Figure 3 is a plan view of the invention with parts cut away to show the bed plate and the grass diverters.

Figure 4 is a plan view of the knife reciprocating drive below the grass delivery plate.

Figure 5 is a detail view of the overload release on the knife drive mechanism.

In the drawings like characters of reference indicate corresponding parts in each figure.

Figure 1:
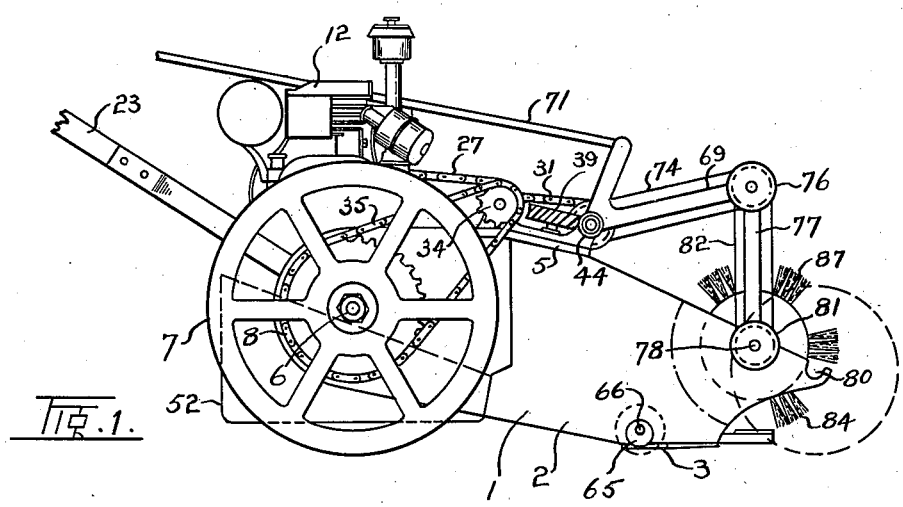
Figure 1 is a side elevational view of the invention.

The numeral 1 indicates a frame consisting of side plates 2 connected together by a transverse sole plate 3, a transverse member 4 and a bed plate 5.

Figure 2:
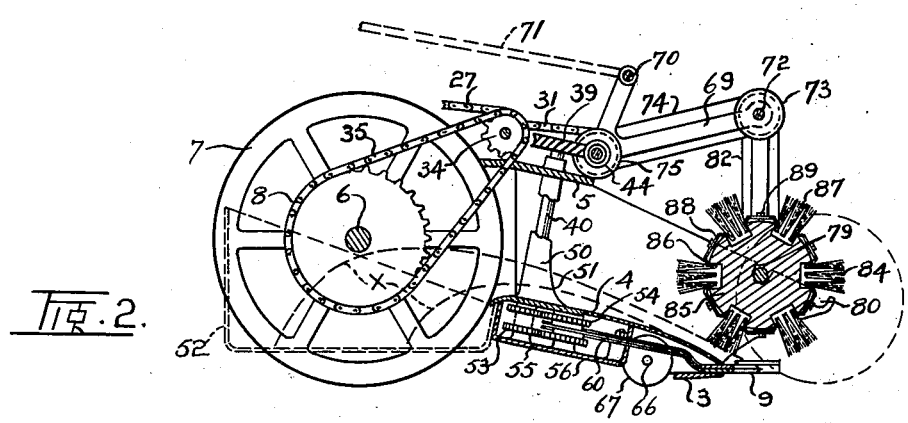
Figure 2 is a sectional view taken on the line 2—2 of Figure 3.

Mounted upon a stub shaft 6 of each of the side plates 2 is a drive wheel 7, which is fitted with a chain sprocket 8, see Figures 1 and 2.

Carried by the sole plate 3 is a pair of sickle knives 9 which are mounted to reciprocate in contact with each other and are suitably tensioned to provide for proper cutting.

Mounted at the forward end of the side frames are horns, generally indicated by the numeral 10 see detail in Figure 4, which horns are provided with outwardly curved inner edges 11 for the purpose of entering the upstanding grass immediately in front of the side frames to urge it over into the cutting zone of the knives 9.

Mounted upon the bed plate 5 is a prime mover 12 preferably an internal combustion engine, which is provided with a drive shaft 13 supported at its free end in a bearing 14. Splined upon the drive shaft 13 are two cone clutch members respectively numbered 15 and 16, which are urged apart by a coil spring 17. Each of the clutch members 15 and 16 are fitted with grooved collars 18 which are engaged by forked bell cranks 19 and 20. The bell cranks are connected by control rods 21 and 22 respectively, which extend to a convenient position upon a shaft or tongue 23 by which the machine is guided. The rods 21 and 22 are obviously provided at their free ends with suitable devices, not shown, to hold them in the position in which they may be set. The rod 21 through its bell crank 19 controls the clutch member 15 and the rod 22 through its bell crank 20 controls the clutch member 16. The clutch members 15 and 16 respectively engage conical discs 24 and 25, both of which are freely rotatable upon the drive shaft 13 when the clutch members are held out of engagement.

Fitted to the conical disc 24 is a sprocket 26 which through a chain 27 drives a sprocket 28 secured to a countershaft 29. Fitted to the conical disc 25 is a sprocket 30 which through a chain 31 drives a sprocket 32 on a countershaft 33. The countershaft 29 is fitted with a free wheeling sprocket 34 at each end, which drives the adjacent chain sprocket 8 through a chain 35 to drive the wheels 7 in a forward direction. Fitted upon the countershaft 33 is an overload release mechanism generally indicated by the numeral 38, shown in detail in Figure 5. The release mechanism imparts rotation to a worm gear 39 which is secured to a substantially vertical shaft 40 and consists of a splined sleeve 42 integral with a set collar 43 both of which are non-rotatably secured to the countershaft 33. Slidably mounted upon the splined sleeve 42 is a worm 44 of relatively quick pitch which normally engages the worm gear 39 and is held up to its work by a spring 45 abutting the set collar 43. Secured to the shaft at the free end of the sleeve 42 is a set collar 46 which limits the outward movement of the worm 44 away from the spring 45. The forward side of the vertical shaft 40 where it extends between the bed plate 5 and the transverse member 4 is encased with a streamlined cover 50 for the purpose of preventing grass thrown into the machine from being caught by said shaft. The front edge of said casing is curved inwardly and upwardly as at 51 from the base to enable any grass striking it to ride upwardly and in so doing detach itself that it may be driven into a grass receiver shown in Figure 2 and indicated by the numeral 52.

Mounted at the lower end of the shaft 40 are two pinions 53 of identical size, which impart rotation to corresponding gears 54, one of which is mounted from the underside of the transverse member 4 and the other is mounted on the base 55 of a gear case 56 secured to the underside of the transverse member 4. The gears 54 are each fitted with a crank pin 57 upon which is mounted an oscillating slide 58. Pivotally mounted upon a pin 59 at the forward end of the gear case is a pair of levers 60 each of which extends at its rear end through one of the slides 58 and is provided at its forward end with a gear tooth 61 which engages a corresponding detent 62 in one of the knives 9, so that as the gears 54 are rotated the levers 60 will be reciprocated and reciprocatory motion will also be imparted to the knives.

In each of the side frames 2 is a circular disc 65, which discs are eccentrically bored to receive the ends of a shaft 66. The discs are adapted to be secured in any position desired to adjust the height of the shaft above the lawn level. The shaft 66 is provided with a pair of freely rotatable rollers 67 which serve to support the forward end of the machine.

Journalled upon bearings 68 in which the countershaft 33 is also journalled, is a swinging frame 69 having cross bars 70 from which a suitable lift rod 71 extends for the purpose of raising the forward end of the frame and its depending parts. Journalled between the free ends of the frame 69 is a shaft 72 which is fitted with a pulley 73 and is driven through a belt 74 from a pulley 75 secured upon the countershaft 33. The outer ends of the shaft 72 are fitted with pulleys 76 and swingably supported from said shaft is a depending frame 77 in the lower ends of which a shaft 78 is journalled. The side frames 2 are provided at their forward extremities with semi-circular recesses 79 and 80 into which the lower extremities of the depending frame 77 are adapted to be selectively received. The shaft 78 is fitted at its outer ends with pulleys 81 connected by belts 82 to the pulleys 76.

A brush 84 mounted upon the shaft 78, is made up of a substantially cylindrical core 85, see Figure 2, which is grooved longitudinally as at 86 to receive a plurality of detachable brush sections 87. The brush sections are held within their grooves by cleats 88 fastened to the core by screws 89.

In operating the machine, the clutch elements 16 and 25 are engaged by manipulating the control rod 22 to impart rotation to the countershaft 33 and the brush 84 and to reciprocate the knives 9. The wheels 7 are set in motion by engaging the clutch members 15 and 24 by manipulating the control rod 21. When the machine is being driven forward, if an obstruction such as a nail or other object is caught by the knives the resistance set up thereby to the rotation of the worm 44 on the countershaft 33 will cause the worm gear 39 to drive the worm wheel along the splined sleeve 42 against the spring 45 and towards the set collar 43 until said worm is out of mesh with the worm wheel. In such an event the operator will obviously stop the machine and disengage the clutch elements 16 and 25. When the obstruction is removed, the countershaft may be rotated in a reverse direction to restore the worm to its proper position of mesh with the worm gear 39.

The brush 84 which is normally set directly above the cutting edge of the knives 9 will throw the grass cut in a trajectory indicated in dotted lines as at X in Figure 2 over the transverse member 4 and into the grass receiver.

When it is desired to sweep the lawn, the brush is moved to the forward position indicated in dotted line in Figure 1, and the lower ends of the depending frame 77 are cradled in the recesses 80.

What I claim as my invention is:

1. In a power driven lawn mower having a power unit, a frame and a sickle type cutting element extending transversely of the general direction of travel, a swinging frame mounted upon the mower frame, a rotary brush carried by said swinging frame and driven from the power unit, said frame having side plates provided with recesses, said recesses being adapted selectively to support the brush for rotation directly above the cutting edge of the cutting elements and in contact with the ground in front of and below said cutting edge, one recess of each side plate being located vertically above the cutting element and another recess of each side plate being located forwardly of the cutting element.

2. In a power driven lawn mower having a power unit, a frame and a sickle type cutting element extending transversely of the general direction of travel, a swinging frame mounted upon the mower frame, a rotary brush carried by said swinging frame and driven from the power unit, said frame having side plates and a transverse bottom wall member, said member being extended from the cutting elements towards the rear of the frame and being convexly curved to provide an upwardly inclined passage through which grass cuttings are adapted to be projected.

PHILIP ALEXANDER CAMPBELL.